United States Patent [19]
Chu et al.

[11] Patent Number: 4,810,475
[45] Date of Patent: Mar. 7, 1989

[54] REMOVAL OF HCN, AND HCN AND COS, FROM A SUBSTANTIALLY CHLORIDE-FREE GASEOUS STREAM

[75] Inventors: Humbert H. Chu, Houston; Stephen N. Massie, Spring, both of Tex.

[73] Assignee: Shell Oil Company, Houston, Tex.

[21] Appl. No.: 86,463

[22] Filed: Aug. 18, 1987

[51] Int. Cl.$^4$ ............................................. C01C 3/00
[52] U.S. Cl. .................................................. 423/236
[58] Field of Search ..................... 423/235, 235 D, 236

[56] References Cited

U.S. PATENT DOCUMENTS

| 3,859,415 | 1/1975 | Nicklin et al. | 423/236 |
| 4,100,256 | 7/1978 | Bozzelli et al. | 423/220 |
| 4,254,094 | 3/1981 | Hegarty | 423/648 |
| 4,271,133 | 6/1981 | Tellis | 423/230 |
| 4,332,781 | 6/1982 | Lieder | 423/573 G |
| 4,359,450 | 11/1982 | Blytas et al. | 423/573 G |
| 4,409,199 | 10/1983 | Blytas | 423/226 |
| 4,511,668 | 4/1985 | Nozue et al. | 500/84 |

FOREIGN PATENT DOCUMENTS

| 2352425 | 5/1974 | Fed. Rep. of Germany | 423/236 |
| 2574310 | 6/1986 | France . | |
| 695496 | 8/1953 | United Kingdom | 423/236 |

OTHER PUBLICATIONS

Journal of Applied Chemistry, vol. 2, Part 12, Dec. 1952, pp. 681 through 684.

Primary Examiner—Gregory A. Heller
Attorney, Agent, or Firm—Albert J. Adamcik

[57] ABSTRACT

HCN, and HCN along with COS may be removed from gaseous streams, particularly those derived from the gasification of coal, by contacting the gas stream with a catalyst consisting essentially of specified amounts of molybdenum oxide, or precursor or precursors thereof, and alumina.

24 Claims, No Drawings

REMOVAL OF HCN, AND HCN AND COS, FROM A SUBSTANTIALLY CHLORIDE-FREE GASEOUS STREAM

BACKGROUND OF THE INVENTION

The presence of hydrogen cyanide (HCN) in various gaseous streams complicates removal of additional impurities, e.g., removal of $H_2S$ or $CO_2$, and poses problems insofar as product quality and pollution control requirements are concerned. In particular, gas streams derived from the gasification of coal generally have significant minor quantities of HCN which must be dealt with before the gas is utilized. In some cases significant quantities of COS may also be present, and these must be removed to meet the specification for total sulfur in the product gas. A gas phase catalytic treatment which removes HCN, and preferably COS as well, from coal gasification derived synthesis gas streams, with minimal water-gas shift and without generating mercaptans (such as methyl mercaptan) might have great economic value. The invention concerns such a process.

SUMMARY OF THE INVENTION

Accordingly, in one embodiment, the invention relates to a process for the removal of a minor amount of HCN from a gaseous stream containing HCN, particularly that derived from the gasification of carbonaceous materials, comprising contacting said gaseous stream under reaction conditions with water in the presence of a catalyst consisting essentially of from about 1.0 percent to about 90 percent molybdenum oxide (or precursor or precursors thereof) and from about 10 percent to about 99.0 percent of $Al_2O_3$, all percentages by weight, based on the weight of the $MoO_3$ and the $Al_2O_3$. Preferably, the catalyst will consist essentially of from about 1.5 percent to about 20 percent molybdenum oxide (or precursor or precursors thereof), and from about 80 percent to about 98.5 percent alumina, and most preferably, about 1.5 percent to about 15 percent molybdenum oxide (or precursor or precursors thereof), and from about 98.5 percent to 85 percent alumina, all percentages by weight, based on the weight of the $MoO_3$ and the alumina. Because of the susceptibility of aluminas to HCl or chloride attack, the stream treated is one having low or minimal chloride content, i.e., at least substantially chloride free. This requirement may be met because the synthesis gas produced by the gasification does not contain significant concentrations of HCl or chloride, or because the chloride content of the stream is removed prior to contact with the catalysts of the invention, such as by scrubbing the synthesis gas with water.

In another embodiment, the invention relates to a process of the type described wherein COS present in the gaseous stream (normally synthesis gas) is also removed, wherein minimal water gas shift occurs, and wherein minimal formation of methyl mercaptan is encountered.

DETAILED DESCRIPTION OF THE INVENTION

As noted, the catalysts employed consist essentially of from about 1.0 percent to about 90.0 percent, preferably about 1.5 percent to about 20.0 percent of molybdenum oxide, and from about 10.0 percent to about 99 percent, preferably from about 80.0 percent to about 98.5 percent, alumina, all percentages by weight, based on the weight of the molybdenum oxide and the alumina. The molybdenum oxide is preferably supplied as the oxide, although another compound or compounds (precursors) which yield the oxide by decomposition, particularly under the conditions of the reaction, e.g., ammonium molybdates, molybdenum hydroxide, or molybdenum carbonate, may be used. The catalyst may be prepared by any suitable method, such as by co-mulling, co-precipitation, deposition, or impregnation. The type of alumina employed is not critical. For example, alpha, beta, and gamma alumina may be employed. Aluminas having a B.E.T. surface area above 80 square meters per gram are preferred, aluminas having a B.E.T. surface area of from about 100 meters per gram to about 400 square meters per gram being most preferred. A suitable method of preparation of the catalysts is to impregnate the molybdenum oxide on gamma alumina granules with solutions of ammonium molybdates, the resulting mixture being calcined at about 900° F. or more to cause decomposition of the molybdates to oxides, but the temperatures should not be so high that sintering occurs.

The particular gas streams treated according to the invention may vary widely, as will be evident to those skilled in the art. Any gaseous stream containing HCN and from which it is desired to remove the HCN, and which itself or its constituents do not interfere with the hydrolysis of the HCN, such as by reaction with the catalyst, as in the case of HCl, may be treated according to the invention, as will also be apparent to those skilled in the art. Gaseous streams or effluent particularly suited to the invention include fuel gases produced by gasification procedures, e.g., fuel or effluent gases derived from or produced by the gasification of carbonaceous materials such as coal, petroleum, shale, tar sands, etc., wherein a significant quantity of HCN is present. In such gasification processes, the gaseous effluents are often quenched with water or aqueous liquids, and gaseous streams derived from stripping the water or aqueous liquids may contain HCN and may also be treated by the invention.

The amount of HCN to be removed from such streams is a minor amount, and may range from about 0.002 percent to about 20 percent by volume. Generally, in process gases contemplated, the HCN content will range from 0.002 percent to about 1.0 percent by volume. COS may be present in zero or negligible quantities, and may be present in minor amounts of, say, from about 0.01 to about 10.0 percent by volume, with 0.01 to about 3.0 percent by volume not unusual in the streams contemplated.

Reaction conditions employed are those which will favor the hydrolysis, and if COS is present, conversion thereof, while minimizing water gas shift and mercaptan formation. In general, temperatures of from about 225° F. to about 900° F., preferably 300° to about 600° F. may be employed, with pressures of about 1 to about 300 atmospheres, preferably 1 to 40 atmospheres, being utilized. Gaseous hourly space velocities (GHSV) of from 100 to 10,000 may be employed, preferably from 1000 to 7500. Mercaptan formation is reduced by use of higher temperatures. Water from the hydrolysis may be present in the gaseous stream, or it may be added, preferably at least on about a mol per mol basis, and, most preferably at much higher levels, i.e., in large stoichiometric excess.

The following procedures were conducted.

EXAMPLE I

A simulated coal gasification reactor stream having the following composition was employed:

|  | mol % |
|---|---|
| $H_2$ | 8.61 |
| CO | 19.3 |
| $CO_2$ | 1.71 (5.6% dry) |
| $H_2S$ | 0.28 |
| HCN | 0.10 |
| $H_2O$ | 70.00 |

A catalyst according to the invention, a composite of 4 percent molybdenum as the oxide with alumina, was prepared in the following manner. All percentages expressed are by weight, unless otherwise specified.

A 12 percent solution of ammonium heptamolybdate was prepared by mixing appropriate amounts of ammonium dimolybdate, molybdenum trioxide, and water. To insure dissolution, the mixture was heated to 165°–170° F.

A solution of deionized water, acetic acid, and 12 percent ammonium heptamolybdate were added to a muller containing gamma alumina powder (L.O.I.26.0) having a B.E.T. surface area of about 320 square meters per gram. The alumina and molybdenum heptamolybdate were added in amounts necessary to give the percentages, in the final product, mentioned. The acetic acid (80%) was supplied in a quantity to provide proper strength in the final catalyst, in this case, 4.3 percent by weight acetic acid, based on the weight of the dry alumina. Deionized water was then added in an amount sufficient to provide that the mixture, after mulling, had a loss on ignition of 60.0. The mixture was then mulled at low speed for 10 minutes, and then at high speed for 40 minutes. The mix was then extruded to provide ⅛ inch trilobe particulates or composites, which were dried at about 320° F. for about an hour and then calcined in a kiln having an exit temperature of about 1300° F. The composites were tested as described hereinafter. For comparison, alumina, alone, and other catalysts containing various metallic components were also tested.

The gas stream was fed to a tubular 0.75 inch (I.D.) reactor containing a 3.9 inch charge of the given particulate catalyst under atmospheric pressure at 3000 scf/(cf.hr). Two different temperatures were employed, 350° F. and 450° F. The results are shown, as follows:

| Catalyst | Temp °F. | Conversion of HCN % | Catalysis of Shift Rx % $CO_2$ in excess of feed (dry basis) | Formation of RSH PPMV | Formation of COS PPMV |
|---|---|---|---|---|---|
| 4% Mo/$Al_2O_3$ | 350 | 74 | 0.1 | 42 | 18 |
|  | 450 | 98 | 0.7 | 23 | 29 |
| $Al_2O_3$ | 350 | 0 | 0.0 | <4 | 15 |
|  | 450 | 33 | 0.0 | <4 | 15 |
| 2.5% Co—7.2% Mo/Alumina | 350 | 72 | 0.7 | 82 | 485 |
|  | 450 | 98 | 5.8 | 10 | 400 |
| 2.0% Co—6% Mo/Alumina | 350 | 92 | 1.7 | 45 | 230 |
|  | 450 | >99 | 9.0 | <4 | 152 |
| 2.0% Ni—6% Mo/Alumina | 350 | 95 | 2.5 | 95 | 186 |
|  | 450 | >99 | 9.3 | <4 | 142 |

The results show that the procedure of the invention, utilizing a molybdenum-alumina catalyst, achieves high HCN conversion with low catalysis of water gas shift and low mercaptan formation. On the other hand, nickel and cobalt containing catalysts showed relatively high water gas shift and high COS formation.

EXAMPLE II

A procedure similar to that of Example I was conducted, but the synthetic gas stream also contained 0.7 mol percent of COS. The following results were obtained:

| Catalyst | Temp °F. | Conversion of HCN % | Catalysis of Shift Rx % $CO_2$ in excess of feed (dry basis) | Formation of RSH PPMV | Conversion of COS % |
|---|---|---|---|---|---|
| 4% Mo/$Al_2O_3$ | 350 | 89 | 1.3 | 60 | >99 |
|  | 450 | >99 | 1.9 | 40 | >99 |
|  | 550 | >99 | 4.1 | 0 | 98 |

The results show that the procedure of the invention is effective for simultaneous conversion of HCN and COS.

What is claimed is:

1. A process for the removal of a minor amount of HCN from an at least substantially chloride-free gaseous stream containing HCN comprising
    contacting said gaseous stream under reaction conditions with water in the presence of a catalyst consisting essentially of from about 1.0 percent to about 90 percent molybdenum oxide, or precursor or precursors thereof, and from about 10 percent to about 99.0 percent of aluminum oxide, all percentages by weight, based on the weight of the molybdenum oxide and the alumina.

2. The process of claim 1 wherein the catalyst consists essentially of from 1.5 percent to about 20 percent molybdenum oxide, or precursor or precursors thereof, and from about 80 percent to about 98.5 percent alumina, all percentages by weight, based on the weight of the molybdenum oxide and the alumina.

3. The process of claim 1 wherein the catalyst consists essentially of from 1.5 percent to about 15 percent molybdenum oxide, or precursor or precursors thereof, and from about 85 percent to about 98.5 percent alumina, all percentages by weight, based on the weight of the molybdenum oxide and the alumina.

4. The process of claim 1 wherein the gaseous stream is a synthesis gas.

5. The process of claim 2 wherein the gaseous stream is a synthesis gas.

6. The process of claim 3 wherein the gaseous stream is a synthesis gas.

7. The process of claim 4 wherein the synthesis gas is derived from the gasification of coal.

8. The process of claim 5 wherein the synthesis gas is derived from the gasification of coal.

9. The process of claim 6 wherein the synthesis gas is derived from the gasification of coal.

10. A process for the removal of a minor amounts of HCN and COS from an at least substantially chloride-free synthesis gaseous stream comprising contacting said gaseous stream under reaction conditions with water in the presence of a catalyst consisting essentially of from about 1.0 percent to about 90 percent molybdenum oxide, or precursor or precursors thereof, and from about 10 percent to about 99.0 percent of aluminum oxide, all percentages by weight, based on the weight of the molybdenum oxide and the alumina.

11. The process of claim 10 wherein the catalyst consists essentially of from 1.5 percent to about 20 percent molybdenum oxide, or precursor or precursors thereof, and from about 80 percent to about 98.5 percent alumina, all percentages by weight, based on the weight of the molybdenum oxide and the alumina.

12. The process of claim 10 wherein the catalyst consists essentially of from 1.5 percent to about 15 percent molybdenum oxide, or precursor or precursors thereof, and from about 85 percent to about 98.5 percent alumina, all percentages by weight, based on the weight of the molybdenum oxide and the alumina.

13. The process of claim 10 wherein the gaseous stream is a synthesis gas.

14. The process of claim 11 wherein the gaseous stream is a synthesis gas.

15. The process of claim 12 wherein the gaseous stream is a synthesis gas.

16. The process of claim 13 wherein the synthesis gas is derived from the gasification of coal.

17. The process of claim 14 wherein the synthesis gas is derived from the gasification of coal.

18. The process of claim 15 wherein the synthesis gas is derived from the gasification of coal.

19. The process of claim 1 wherein the alumina has a B.E.T. surface area of at least about 80 square meters per gram.

20. The process of claim 2 wherein the alumina has a B.E.T. surface area of at least about 80 square meters per gram.

21. The process of claim 3 wherein the alumina has a B.E.T. surface area of at least about 80 square meters per gram.

22. The process of claim 10 wherein the alumina has a B.E.T. surface area of at least about 80 square meters per gram.

23. The process of claim 11 wherein the alumina has a B.E.T. surface area of at least about 80 square meters per gram.

24. The process of claim 12 wherein the alumina has a B.E.T. surface area of at least about 80 square meters per gram.

* * * * *